March 25, 1958 C. B. GLOVER ET AL 2,828,196
METHOD OF PRODUCING COMBUSTIBLE GAS RICH IN OIL GAS
Filed April 30, 1954
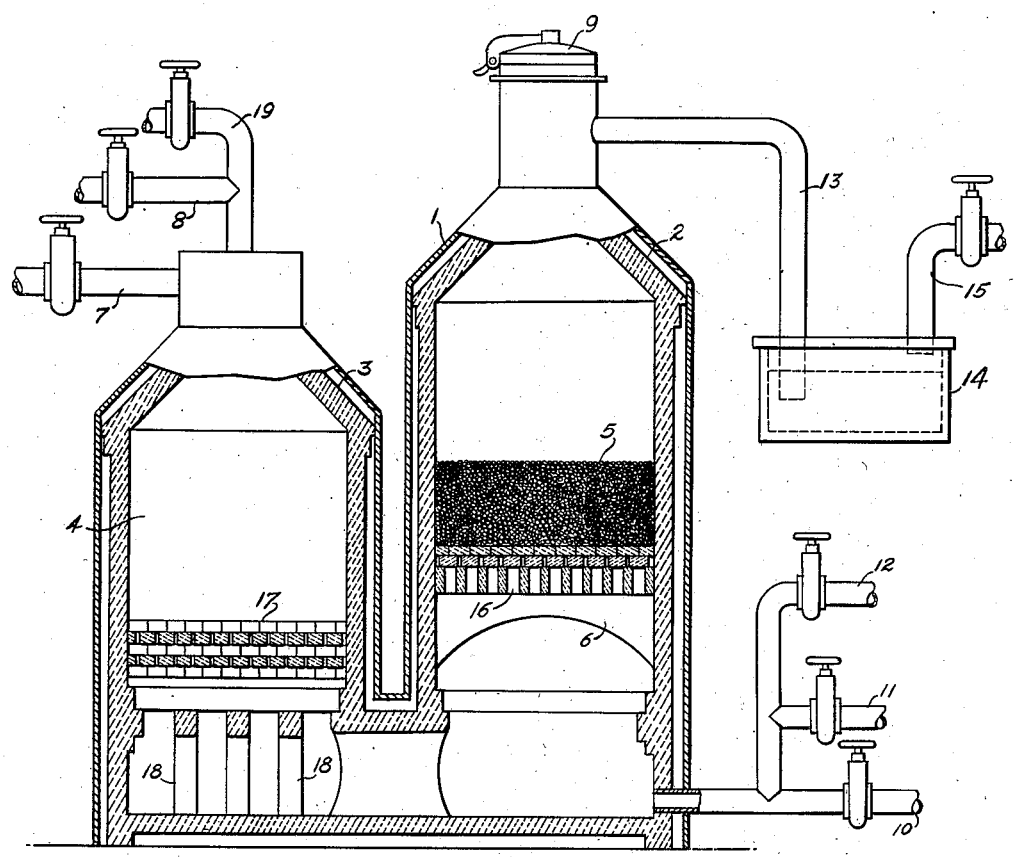
Inventors:
Clarence B. Glover
Charles G. Milbourne
By Howson & Howson
Attys.

2,828,196

METHOD OF PRODUCING COMBUSTIBLE GAS RICH IN OIL GAS

Clarence B. Glover, Springfield, and Charles Gordon Milbourne, Lansdowne, Pa., assignors, by mesne assignments, to The United Gas Improvement Company, Philadelphia, Pa., a corporation of Pennsylvania Application April 30, 1954, Serial No. 426,776

6 Claims. (Cl. 48—214)

The present invention relates to a novel method for producing a combustible gas; and, more particularly, it relates to a method for making a combustible gas rich in high B. t. u. oil gas by a cyclic procedure involving a nickel catalyst and resulting in gas-making efficiencies substantially higher than those realized in the oil gas processes heretofore practiced.

The manufacture of oil gas by the pyrolysis of oil is well known. The general procedure involves a cycle in one portion of which a mass of heat storage refractory material, usually in the form of checkerwork, is heated by passing hot combustion products in contact therewith, and, in another portion of which, vaporized oil is pyrolyzed, that is, thermally cracked, into a fixed gas in passing through the heated refractory material. Oil gas made in this manner consists essentially of gaseous hydrocarbons and hydrogen. When process steam is employed, as is usually the case, it may react with carbon deposited during the process to produce water gas (carbon monoxide plus hydrogen). The amount of water gas present in the oil gas is generally very minor. The severity of the thermal cracking determines the heating value of the oil gas, the more severe the cracking the lower the percentage of higher hydrocarbon gases and the higher the percentage of hydrogen in the gas and the greater the amount of carbon formed. In conventional practice, true oil gas values of less than 1000 B. t. u. can not be made thermally without excessive carbon formation. To the extent that this carbon is converted by process steam to water gas, the heating value of the resulting mixed gas is further reduced.

In the purely thermal cracking of oil molecules, hydrocarbon fragments containing lesser numbers of carbon atoms together with free hydrogen and carbon are first formed. The hydrocarbon fragments, or "free radicals," rearrange themselves in part to the thermally more stable hydrocarbon gases such as methane, ethylene, propylene, and the like, and in part to more stable aromatic ring compounds. These compounds, in turn, are subject to fragmentation or recracking at higher temperatures or longer times of contact, with the production of more free hydrogen and more free carbon and solid aromatic hydrocarbons. When steam is employed, some of the deposited carbon, as stated may react therewith forming, by the water gas reaction, hydrogen and carbon monoxide. In commercial oil gas operations, a balance of temperature and contact time is selected by which the ratio of the normally gaseous hydrocarbons relative to condensibles, aromatics, pitch and carbon, is as high as practicable for the feed stocks employed and for the B. t. u. levels desired in the gas. These ratios in conventional checkerwork oil gas sets are of the order of 40 to 50% for petroleum oils of low Conradson carbon content, and lower for oils of high Conradson carbon or high sulfur. The fact that about half or more of the combined carbon of the oil is not converted to gas, but rather to free carbon, tar, and the like, not only means poor efficiency, but also the production of materials that present handling problems. The production of carbon presents problems with the respect to the elimination thereof since its presence in the gas serves as a contaminant while its accumulation in the heat storage refractory material may result in clogging of the interstices thereof. The production of tar and other liquid products requires expensive equipment for removing such materials from the finished gas. This latter requirement represents an economic disadvantage where the production of the oil gas is primarily to serve peak load demands in which case low equipment cost is the primary consideration.

It is also known that hydrocarbons can be completely reacted with steam in the presence of nickel to form a gas consisting essentially of hydrogen and oxides of carbon, mainly carbon monoxide. The hydrocarbons most generally used in this "reforming" procedure are the gaseous hydrocarbons, particularly methane, although, in certain circumstances, liquid hydrocarbons may be used. The resulting gaseous product, consisting essentially of hydrogen and carbon monoxide as the combustibles, possesses a relatively low heating value, normally in the neighborhood of 250–350 B. t. u. per cubic foot, and therefore requires enrichment with a gas of higher heating value, such as natural gas or oil gas, in order to provide the desired heating value, before distribution in city gas mains.

There have been suggestions concerning the possibility of partially reforming hydrocarbons catalytically into a combustible gas containing some gaseous hydrocarbons and having a higher heating value than the completely reformed gas referred to in the preceding paragraph. With one possible exception, however, applicants know of no actual instance where liquid hydrocarbons have been converted into a combustible gas rich in oil gas and having a heating value in the high B. t. u. oil gas range through the agency of a nickel catalyst. The possible exception referred to is a process recently developed in Europe wherein oil is sprayed on to hot nickel-containing bodies and thereby converted into combustible gas having heating values in the oil gas range. A consideration of the published data concerning this process shows, however, that the efficiencies obtained by this process in producing oil gas are very low, from over 50% to 85% of the combined carbon content of the oil appearing as the low B. t. u. water gas reaction product of carbon with steam and as carbon, tar, and the like. That is to say, the higher B. t. u. gas produced, while consisting largely of oil gas with a minor amount of water gas, is made at the expense of producing a large amount of carbon, tar, and the like; whereas the lower B. t. u. gas is preponderantly water gas, and the production thereof is still accompanied by the production of large amounts of carbon, tar, and the like. Moreover, the gas-generating capacity of this process is also relatively low.

It is the principal object of the present invention to provide a novel cyclic catalytic method for producing from a liquid petroleum hydrocarbon a combustible gas consisting mainly of oil gas by which are provided conversion efficiencies substantially higher than those heretofore obtainable.

It is another object of the present invention to provide a novel cyclic catalytic method for producing from liquid petroleum hydrocarbons a combustible gas consisting mainly of oil gas which process not only provides conversion efficiencies substantially higher than heretofore obtainable, but also accomplishes these results under high capacity operation.

Still another object of the present invention is to provide a method for producing a combustible gas consisting mainly of oil gas not only at high conversion efficiencies under high capacity operation but also with minimum plant investment costs per unit of gas volume produced.

Still another object of the present invention is to provide a method by which the foregoing objects may be realized by the catalytic treatment of vaporized liquid petroleum hydrocarbons including petroleum oils containing high contents of Conradson carbon and sulfur, in spite of the fact that the catalyst employed is sensitive both to carbon deposition and to sulfur poisoning.

Other objects will become apparent from the following specification and the claims.

One might think that the production of oil gas by the treatment of a hydrocarbon with a catalyst would merely involve subjecting the hydrocarbon to the catalyst for a shorter contact time than is the case in complete reforming. Following this theory, an attempt was made to produce such an oil gas from light oil by reducing the thickness of catalyst zone through which the oil passed. However, failure resulted. Heavy carbon deposition and penetration during the gas-making period resulted in a general loss of catalyst activity. To the extent that carbon is deposited on the catalyst, catalyst effectiveness in promoting hydrocarbon cracking reactions is reduced and the process approaches ordinary thermal cracking in nature. Attempts completely to remove excessive deposits during each heating period resulted in excessively high surface temperatures and spalling of the catalyst leading to its rapid destruction.

It has been found, however, that it is possible catalytically to crack or split liquid petroleum hydrocarbons, including heavy oils, into oil gas, even a high B. t. u. oil gas, with unusually high conversion efficiencies, substantially higher, in fact, than that heretofore obtainable in conventional oil gas processes. While a minor amount of water gas is also produced in the process, the present invention is primarily concerned with the efficient conversion of liquid petroleum hydrocarbons to oil gas. Moreover, the production of a combustible gas rich in oil gas at high conversion efficiencies can be achieved with maximum production capacity with maintenance of optimum catalyst activity. The foregoing is accomplished by controlling certain conditions within fixed limits and by observing definite relationships between certain of these controlled conditions. These conditions include: hydrocarbon feed rate, concentration of available nickel on the catalyst, mass of the catalyst body relative to its surface area, and temperature. The success of the process is governed by the catalytic effectiveness of the nickel. This depends not only upon proper distribution of the cracking load with respect to catalyst surface area and available nickel concentration so that carbon and sulfur deposition is not concentrated unduly at any limited portion of the catalyst zone, but also upon the way in which the heating-regeneration portion of the cycle is conducted so that regeneration of the catalyst by substantially complete elimination of carbon and sulfur during this portion of each cycle is possible while maintaining the temperatures throughout the catalyst zone within closely controlled limits.

The process of the present invention, therefore, is a cyclic procedure, that is, it involves alternating heating-regeneration and gas-making steps, utilizing a hot fixed zone of catalyst comprising nickel-containing refractory bodies having a mass between about 95 and about 1000 lb. per 100 square feet of surface and having nickel available at the surface thereof in a concentration, in the outer $\frac{1}{32}$ inch of catalyst body, of between about 1.4 and about 4 lbs. per 100 square feet of surface, and comprises, during the gas-making portion of the cycle, passing a vaporized liquid petroleum hydrocarbon and steam into said zone of catalyst at a rate with respect to the area of catalyst surface and concentration of available nickel in accordance with the equation:

$$\frac{\text{Hydrocarbon feed rate (lb. carbon/hour)}}{\text{Catalyst surface (ft.}^2\text{)} \times \text{Ni concentration (lb./100 ft.}^2 \text{ surface)}} = X$$

wherein X is between about 2 and about 6, preferably between about 3 and about 5, the temperature gradient in said catalyst zone during the passage of hydrocarbon thereinto being no greater than about 100° F.; then, before the temperature of the catalyst zone drops appreciably more than about 100° F., discontinuing the flow of hydrocarbon, and reheating and regenerating the catalyst zone.

The process of the present invention will be more readily understood from a consideration of the drawing in which Figure 1 is a side elevational view, partly in section, of one form of apparatus in which the present process may be carried out.

By controlling the stated conditions and observing relationships between certain of them as discussed above, liquid petroleum hydrocarbons can readily be converted into combustible gas consisting largely of oil gas and having heating values ranging from about 700 B. t. u. to about 1200 B. t. u. ($N_2$ free basis). Moreover, this gasification can be accomplished at an unusually high conversion efficiency, that is to say, proportion of carbon in the feed stock appearing in the gas. In fact, by the present process conversion efficiencies of from 70% to 85% are easily obtained, and these are to be contrasted to efficiencies in the order of 40–50% achieved by conventional oil gas processes in the same B. t. u. range. Such efficiencies are also obtained at high operating capacities, and the process can be operated in equipment involving minimum investment cost per unit of gas volume produced since the equipment is simple and may be readily constructed of conventional gas-making equipment with appropriate modifications as will be apparent from the drawing.

A valuable feature of the process is that it can be utilized in the treatment of any normally liquid petroleum hydrocarbon ranging from light distillates to heavy oils of high Conradson carbon and sulfur contents. Examples of liquid petroleum hydrocarbons which may be treated are naphtha, gasoline, kerosene, diesel oil, bunker C oil, heavy residuum oil, and the like.

The catalyst employed in accordance with the process of the present invention comprises discrete bodies of refractory material having nickel available at least at the surface thereof. The nickel may merely be dispersed at the surface of suitable refractory bodies, such as alumina, aluminum silicate, magnesia, or the like, or it may be distributed throughout the refractory body so long as it is also present at the surface. In the preparation of a preferred type of catalyst, preformed refractory bodies, such as Alundum, are impregnated with a nickel salt and thereafter the impregnated shapes are calcined to form the oxide of the nickel which is subsequently reduced. The catalyst, as stated, will be in the form of discrete bodies, such as spheres, cubes, cylinders, pellets, pebbles, and the like. The catalyst bodies will also be relatively dense, that is, they will have a porosity no greater than about 35%, and preferably of from about 10 to about 20%.

It has been found that the reactions taking place in the present process are confined to a very thin surface layer of the catalyst body. At the relatively high space velocities employed, the effective nickel has been found to be that present in the outer $\frac{1}{32}$ of an inch of the catalyst body. The concentration of nickel in this outer layer has been found to be an important factor. With too little nickel the body approaches a non-catalytic refractory body resulting primarily in thermal cracking as in conventional oil gas processes, and the gas-making operation becomes difficult to control. It has been found that the amount of nickel in the outer $\frac{1}{32}$ of an inch of the catalyst bodies should be at least 1.4 lbs. per 100 square feet of catalyst surface. Preferably the amount of nickel on this basis is between about 2 and about 3 lbs. per 100 square feet of catalyst surface. On the other hand, if the concentration of nickel at the surface is too high, it has been found that the reactions are concentrated in a relatively thin portion of the catalyst zone and unduly large amounts of carbon become deposited per unit surface of catalyst body. This carbon deposition not only reduces the effectiveness of the nickel during the gas-making portion of the cycle thereby causing the body to approach in function a non-catalytic refractory body and thereby promoting thermal cracking, but also gives rise to difficulty in its removal since long burning times or excessive temperatures would be required which in turn would result in high local surface temperatures and spalling. Amounts of nickel much in excess of about 4 lbs. per 100 square feet of catalyst surface may give rise to the above discussed carbon deposition problem. Within the above-mentioned limits, combinations of catalyst bodies having different concentrations of available nickel may be employed.

Another important factor in accordance with the process of the present invention is the mass of the catalyst bodies in relation to the surface presented thereby. Temperature variations at the catalyst surface during the gas-making portion of the cycle must be maintained at a minimum. During the gas-making portion of the cycle, heat is being abstracted from the catalyst bodies. The greater the mass of catalyst body in relation to the surface area presented thereby, that is to say the greater the weight of the catalyst per unit surface area, the less rapid is the drop in temperature at the catalyst surface during the gas-making portion of the cycle. Each catalyst body, therefore, must serve as a reservoir for stored heat which can be conducted to the catalyst surface during the gas-making reactions. Hence, the catalyst size must not be less than that required to insure sufficient heat storage to prevent too rapid a temperature drop at the catalyst surface. On the other hand, too large a catalyst body size results in excessive mass and volume per unit of catalyst surface and therefore, inefficient utilization of catalyst space. It has been found that the mass of each of the catalyst bodies should be such as to present between about 95 and about 1000 lbs. per 100 square feet of catalyst surface area. In terms of spherically shaped catalyst bodies comprising Alundum of less than 35% porosity as the carrier, for example, this would mean diameters of between ½ inch and about 3 inches.

The exact size of the catalyst bodies may depend to some extent upon the nature of the liquid petroleum hydrocarbon being treated. It has been found that with the heavier petroleum hydrocarbons larger sized catalyst bodies are desirable. While the larger sized catalyst bodies can also be used in the treatment of the lighter liquid petroleum hydrocarbons as well as the heavier hydrocarbons, the converse is not generally true since the smaller sized catalyst bodies are not as effective with the heavier hydrocarbons as are the larger sized catalyst bodies. For heavier hydrocarbons, such as diesel oil, bunker C oil, and the like, it is preferred that the mass of the catalyst be such as to present between about 750 and about 1000 lbs. per 100 square feet of catalyst surface area.

Combinations of catalyst bodies having different masses or sizes may be employed. However, extreme differences in catalyst body sizes such as would cause close packing and excessive resistance to gas flow should be avoided. The void space between the catalyst bodies preferably represents about 35 to 40% of the volume of the catalyst zone. This also prevents excessive rates of mass transfer between the catalyst surface and the reactant hydrocarbon vapors and consequent localization of carbon deposition.

In accordance with the process of the present invention, the rate of flow of the petroleum hydrocarbon into the catalyst zone is controlled with respect to the nature of the nickel catalyst employed. The absolute flow rate of the hydrocarbon may, of course, vary widely depending upon the size of the gas-producing equipment. The important factor, however, insofar as the present process is concerned, is the relationship between the flow rate of the hydrocarbon reactant and the catalyst mass, surface and available nickel. Since the mass of catalyst body and the nickel concentration have been related to surface this relationship is most easily expressed as a function of hydrocarbon feed rate and total available nickel. Since the nature of the petroleum hydrocarbon will vary as to molecular weight, carbon-to-hydrogen ratio, and the like, it is most convenient to express the flow rate thereof in terms of pounds per hour of carbon in the hydrocarbon employed. It has been found that, in order to produce a gas having a heating value in the oil gas range at the conversion efficiencies referred to above, it is necessary that the feed rate of petroleum hydrocarbon be so controlled with respect to the available nickel as to provide a value of between about 2 and about 6, preferably between about 3 and about 5, for the following ratio, the weight of nickel being that in the outer 1/32 inch of the catalyst body:

$$\frac{\text{Hydrocarbon feed rate (lb. carbon/hour)}}{\text{Catalyst surface (ft.}^2\text{)} \times \text{Ni concentration (lb./100 ft.}^2 \text{ surface)}}$$

Process steam is also employed with the hydrocarbon reactant during the gas-making portion of the cycle to serve as diluent and to aid in conducting heat to the vaporized hydrocarbon, and for such water gas reaction as may be desired. The amount of steam employed will generally not be less than about .8 lb. per pound of carbon in the hydrocarbon reactant. While the proportion of steam may be well above this figure, such as up to 2 to 3 lbs. normally it is not necessary to employ over about 1 lb. per pound of carbon in the hydrocarbon. Process air may also be employed during the gas-making portion of the cycle when a higher gravity gas is desired. Such use of air also helps to reduce temperature swing by combustion during the gas-making step.

The foregoing discussion has assumed that the catalyst bodies are substantially completely effective; that is to say, that the catalyst bodies are substantially completely free of carbon and sulfur during the initiation of the gas-making portion of each cycle. In other words, it is essential, in accordance with the process of the present invention, that the catalyst be regenerated during each cycle. The portion of the cycle normally devoted to restoring heat in the gas-making zone therefore, has a twofold function in the present process: (1) to reheat the catalyst zone, and (2) to regenerate the catalyst, and this portion of the cycle will be referred to herein as the "heating-regeneration" portion of the cycle as distinguished from the other main portion of the cycle, namely the "gas-making" portion.

To reheat in part the catalyst zone, hot heating gases are required and these may be provided by burning a fuel and passing the resulting hot products of combustion through the catalyst zone. Part of the reheating of the catalyst zone is also accomplished by the combustion of the carbon during regeneration as discussed more fully hereinafter. A portion of the reheating is also accomplished, in accordance with the present process, by a catalyst oxidation-reduction and combustion sequence also more fully discussed hereinafter.

The regeneration of the catalyst requires oxidizing conditions so that carbon and any sulfur doposited on the catalyst during the gas-making portion of the cycle, may be burned and removed as gaseous oxides. The process will therefore, involve, sometime during the heating-regeneration portion of the cycle, the passage of free oxygen through the catalyst zone in an amount sufficient to oxidize at least substantially completely the carbon and any sulfur contaminating the catalyst. This may be accomplished, for example, by burning the fuel in the presence of excess air so that the hot products of combustion flowing through the catalyst zone will contain free oxygen. On the other hand, air by itself may be, and preferably is, passed through the hot catalyst zone, especially when the hydrocarbon reactant contains over .02% of sulfur. In this latter connection, it is particularly advantageous to pass free air through the catalyst zone at the beginning of the heating-regeneration portion of the cycle. The rapid and complete removal of sulfur requires not only relatively high temperatures, but also a relatively high oxygen concentration, such as in air. The passage of free air through the catalyst zone quickly burns off carbon producing high temperatures. Thus, by passing air through the catalyst zone at the beginning of the heating-regeneration portion of the cycle, the high temperatures and oxygen concentration required for removal of the last traces of the sulfur are readily provided. By analysing the gases issuing from the catalyst zone at this time or later in the heating-regeneration portion of the cycle an indication can be had as to when carbon and sulfur removal is complete. In this connection, increasing sulfur contents in the make gas over an extended period of operation are also an indication that sulfur is not being removed sufficiently during the heating-regeneration portion of each cycle. A convenient test for determining when the gases issuing from the catalyst zone during the regeneration of the catalyst are at least substantially free of sulfur is conducted by passing a sample of the gases through a filter paper impregnated with barium hydroxide, starch, potassium iodate, and potassium iodide in accordance with the test set forth in "Method for the Determination of Toxic Gases in Industry," "Leaflet No. 3, Sulphur Dioxide," published by the British Department of Scientific and Industrial Research, 1938.

As stated previously, one of the important factors of control in the process of the present invention is the maintenance of controlled temperature variations during the gas-making portion of the cycle. That is to say, temperature swing and gradient during the gas-making portion of the cycle must be maintained at a minimum. By temperature "swing" is meant herein the changes in the temperature at any given spot in the catalyst zone throughout the gas-making portion of the cycle, whereas temperature "gradient" as used herein refers to the difference between the mean temperatures of the entrance half and of the exit half of the catalyst zone at any given time during the gas-making portion of the cycle. Since the observed temperature swing may vary depending upon the particular means and method employed in its measurement, the temperature swing referred to herein is based on measurements using a thermocouple in a stainless steel shield imbedded laterally about one foot in the catalyst zone, and located within the central 80% of the catalyst zone.

In accordance with the process of the present invention both temperature gradient and temperature swing will not exceed about 100° F. In other words, for any given hydrocarbon treated in accordance with the present invention, there is a relatively narrow temperature band or range within which the desirable high B. t. u. gas-making reactions are promoted and side reactions, such as, the water gas reaction, carbon deposition, and the like, are held at a minimum. The exact limits of this band or range will depend on the particular petroleum hydrocarbon being treated, and may fall anywhere between about 1400° F. and 1700° F. The selection of the specific range for any particular petroleum hydrocarbon will present no problem to those skilled in the gas-making art as long as the foregoing considerations concerning temperature swing and gradient are observed.

Temperature swing is controlled by providing the proper mass of the catalyst bodies and by proper distribution of the cracking reactions over the surface thereof as discussed above, and by limiting the duration of the gas-making portion of each cycle. In this latter connection, since the gas-making reactions abstract heat from the catalyst zone, the temperature drop therein will depend upon the quantity of reactant gasified per cycle. Generally, at the rates of flow necessary to provide high capacities, the complete cycle of the present process will be limited to about 1.5–3 minutes, the gas-making portion of the cycle taking up 35–55% of that time.

Temperature gradient is controlled primarily by a heating procedure of the type disclosed and claimed in copending application of Harold V. Erickson and Francis W. Hartzel, Serial No. 279,934, filed April 1, 1952, and now matured into U. S. Patent No. 2,759,805 issued on August 21, 1956. As explained in that application, the passage of hot products of combustion through a stationary catalyst zone results in a temperature gradient over the zone wherein the temperatures at the portion of the zone wherein the hot gases enter are substantially higher than the temperatures in the exit portion. It has been found, however, that if the catalyst comprises an easily oxidizable metal, such as nickel, and if, while the catalyst is hot, air or other oxygen-containing gas is passed through the catalyst zone to oxidize the nickel following which a reducing gas is passed through the catalyst zone reducing the oxidized nickel to the elemental metal state, the temperature gradient through the catalyst zone is reversed. In other words, by this latter system of heating, the exit portion of the catalyst zone has a higher temperature than that of the entrance portion. The oxidation of the nickel, of course, generates heat. While the reduction of the oxidized nickel back to metallic form absorbs theoretically the same amount of heat, this reduction is accompanied simultaneously by the oxidation of the reducing gas employed to reduce the catalyst oxide. This oxidation (or combustion) generates an additional quantity of heat. Hence, the net result of this catalyst oxidation-catalyst reduction-combustion sequence is the generation of heat which is stored in the catalyst zone providing the increasing temperature gradient referred to above. To provide relatively uniform temperature conditions throughout the catalyst zone, therefore, the heating-regeneration portion of the cycle may comprise a combination of these two types of heating; namely, the passage of hot combustion products through the catalyst zone and the oxidation-reduction-combustion sequence referred to. By controlling the proportions of each type of heating means, together with the heat liberated by the burning off of deposited carbon, the temperature gradient in the catalyst zone can readily be maintained below about 100° F.

The catalyst-oxidation phase of the above-described catalyst-oxidation, catalyst-reduction, combustion sequence may take place at the same time hot combustion products are passed through the catalyst zone to store heat therein. In this case, the hot combustion products will contain free oxygen provided, for example, by burning the fuel in the presence of excess air. The catalyst-oxidation phase of the described sequence may also be accomplished at a time during the heating-regeneration portion of the cycle other than the time when hot combustion products are passed through the catalyst zone as by the passage of free air through the catalyst zone. In any event, sufficient free oxygen will be passed through the catalyst zone sometime during the heating-regeneration portion of the cycle to substantially completely burn off the carbon and any sulfur deposited in the catalyst zone during the gas-making portion of the cycle and to oxidize nickel therein for the catalyst-oxidation phase of the stated sequence.

In conjunction with the foregoing, the temperature gradient in the catalyst zone may also be further controlled by passing gases, such as hot combustion products or reactants, in reverse directions through the catalyst zone.

Referring then to the drawing, 1 represents a chamber, lined with refractory material 2, serving as a refractory-lined path for confining the catalyst zone. Chamber 1 may be, for example, the superheater of a conventional water-gas set with appropriate modification as is obvious from the drawing. 3 represents a refractory-lined chamber the bottom of which is in fluid flow communication with the bottom of chamber 1. Chamber 3, which may be the carburetter of a conventional carburetted water gas set, contains combustion zone 4 wherein fluid fuel is burned to provide hot gases for internally heating the set including the refractory material and catalyst zone therein. The zone of catalyst in the form of discrete bodies is represented by 5, and is supported as by firebrick arch 6. One or more courses of firebrick 16 arranged in familiar checkerwork pattern, or other heat-accumulating refractory bodies, may be disposed between the supporting arch 6 and catalyst zone 5 to serve as additional heat storage material. Such additional heat storage material will be referred to herein as heat storage zone 16. To prevent the catalyst bodies from falling down through the arches, or heat storage zone 16 if used, the catalyst mass may rest directly on a heavy metal screen (not shown) or on a layer of perforated refractory bricks or tile (not shown).

Numerals 7 and 8 represent, respectively, the air and fluid fuel supply means for combustion to provide hot gases for heating the apparatus, and 9 represents the stack valve through which the waste heating gases may be discharged to the atmosphere, or to a waste heat boiler (not shown), before being discharged to the atmosphere. Some or all of the regeneration air and air used in the discribed catalyst oxidation-reduction-combustion sequence may also be admitted through conduit 7. As discussed above, it may be desirable to pass air in addition to the hydrocarbon and steam through the path during the gas-making portion of the cycle, and some or all of such process air may be admitted through conduit 7. The conduit for the liquid petroleum hydrocarbon reactant for introduction into the path is represented by 10, and a conduit for process steam at 11. Suitable preheating means (not shown) for the petroleum hydrocarbon reactant may be provided to insure its vaporization in the path although it will be realized that a portion or all of the heat required for vaporization thereof may be supplied by the heat stored in the refractory material or catalyst itself. A conduit, 12, may also be provided for admitting some or all of the process air or air used during regeneration of the catalyst and in the catalyst-oxidation phase of the described oxidation-reduction-sequence. 13 represents the conduit through which product gas leaves the path, passing through wash box 14 to storage by way of valved conduit 15. In accordance with known gas practice, the gases leaving the path for storage may pass through a waste heat boiler (not shown) before reaching the wash box. The flow of the respective materials into and from the set through the described conduit means is controlled by suitable valves as shown.

A primary heat storage zone 17 for preheating a portion or all of the regeneration, catalyst-oxidizing or process air or process air or process steam may be, and preferably is provided as shown in the drawing. Heat storage zone 17 comprises heat accumulating refractory bodies such as firebrick arranged in familiar checkerwork pattern, as shown, or randomly arranged pieces of refractory material, or a combination of both. The heat storage material may be supported as by firebrick arches 18. Heat storage zone 16, disposed, in accordance with the preferred embodiment, between the arch and the catalyst zone, may be provided as discussed above, and this may be constructed as described in connection with heat storage zone 17.

Where a primary heat storage zone, such as 17, is employed, a portion or all of the process steam may be introduced prior thereto as through conduit 19. Usually, it will be found advantageous to introduce at least part of the process steam or air, or both, into the combustion zone as through conduits 19 and/or 7 to prevent excessive accumulation of heat at that point. The provision of a heat storage zone between the combustion zone and entrance for the hydrocarbon reactant, as shown in the drawing, represents the preferred embodiment of the present invention, this feature insures the maintenance of the high temperatures adjacent the combustion zone required for rapid igntion and uniform combustion of the fluid fuel during the heating step of the cycle.

The operation of this process is, as stated, cyclic, and the procedure comprises a heating-regeneration period during at least a portion of which air and fluid fuel are admitted through connections 7 and 8, respectively, combustion taking place in combustion zone 4. The hot combustion gases are passed through the confined refractory lined path of chamber 1, storing heat in the lining, 2, and through the catalyst zone and its supporting arches storing heat therein, and may then be discharged through stack valve 9. When a heat storage zone, such as 16, is interposed between the catalyst bed and its supporting arches, the hot gases will also pass therethrough storing heat therein. The hot combustion gases also store heat in the lining of the combustion zone and in the fluid way between the combustion zone and the path of chamber 1, and when a primary heat storage zone, such as 17, is employed, the hot gases will also pass therethrough storing heat therein.

As stated, air itself is preferably passed through the catalyst to burn off carbon and sulfur deposited on the catalyst. This is most advantageously done at the early part of the heating-regeneration period, just before fuel is admitted to the combustion zone. The air for this purpose may be admitted through conduit 7 and/or through conduit 12.

For the initial step of the described catalyst oxidation-reduction-combustion sequence, oxidizing conditions are also required, and air for this purpose may be admitted through conduit 7 and/or through conduit 12. The reduction-combustion portion of this sequence requires reducing conditions, that is, an oxidizable reducing gas must be passed through the catalyst zone to reduce the catalyst metal oxide to metallic state and be in turn burned. For this purpose a producer gas, made by burning, in 4, fuel in the presence of insufficient air to support complete combustion, may be passed through catalyst zone 5. However, this portion of the stated sequence may actually be, and preferably is, conducted during the early stages of the gas-making period when the first increments of hydrocarbon reactant are admitted to the catalyst zone. Sufficient of this material will become converted to reducing gases, particularly hydrogen, to cause the reduction of the catalyst metal oxide to elemental form with the simultaneous combustion of the reducing gas by virtue of the oxygen of the nickel oxide. During this step, the gases produced may, if desired, be vented to the atmosphere through stack valve 9.

After the path is at operating temperature and the catalyst is at least substantially free of carbon and sulfur as may be determined, for example, by analyzing samples of the gases leaving the catalyst zone, the gas-making portion of the cycle is commenced. Connection 10 is opened to admit the liquid petroleum hydrocarbon reactant. At the same time process steam may be admitted through connections 11 and/or 19 and any process air may be admitted through connections 12 and/or 7. The liquid hydrocarbon, if not already vaporized upon admission to the path, becomes vaporized by virtue of high temperatures therein. Through contact with and radiation from the hot refractory material of the lining and arches supporting the catalyst zone the hydrocarbon, and the process steam, and process air if used, become heated substantially to reaction temperature. When a portion or all of the process steam and/or air is admitted to the combustion zone, it becomes preheated in part by contact with and radiation from the hot refractory-lining and any other heat storage material such as heat storage zone 17 and its supporting arches, preceding the path of chamber 1. In any event, all the reactants absorb heat and become preheated substantially to reaction temperatures by the time they pass into the catalyst zone 5. During the gas-making portion of the cycle, stack 9 is closed.

In passing through the catalyst zone 5, the hydrocarbon reactant first becomes broken down into stable hydrocarbon gases such as methane, ethylene, propylene and the like, and into hydrogen and carbon. Some hydrogen and carbon monoxide are also formed by reaction between this carbon and process steam. The product thus issuing from the catalyst zone is in the form of a stable, fixed combustible gas comprising gaseous hydrocarbons, hydrogen and carbon monoxide. The gas is led off through conduit 13 into wash box 14 and, by way of valved conduit 15, to storage.

Before the temperature of the catalyst zone has dropped more than about 100° F. as discussed previously herein, the admission of hydrocarbon reactant through conduit 10, and of process steam through conduit 11 and/or 19, and any process air through conduit 12 and/or 7 is stopped, and the set again heated and catalyst zone regenerated as described.

It will be realized that, in accordance with common gas-making practice, steam purges may be, and preferably are, made between the heating and gas-generating portions of the cycle, or between the gas-generating and heating-regeneration portions of the cycle, or both. These purges, as known to those familiar with the gas-making art, serve to clear the system of undesirable gases which may contaminate the generated gas or serve to force residual desirable gases to storage. Such purges may be conducted as by admitting steam through conduit 19.

While the drawing in Figure 1 illustrates a two-shell set, it will be understood that a single chamber or three chambers may be employed, and the process carried out following the same general principles described above. Likewise, while the catalyst zone is illustrated as a single layer or mass, it will be realized that the catalyst zone may be in the form of two or more separate layers including layers in separate shells.

It has also been found that the provision of a small amount of nickel on the exposed surfaces of the heat storage refractory material with which the hydrocarbon reactant will come into contact after it is admitted to the gas-making set and before it reaches the catalyst zone, such as the refractory lining 2 above conduit 10 and below arch 6, and the surfaces of arch 6 and heat storage zone 16, will prevent thermal cracking of the hydrocarbon in spite of the fact that the temperature of such heat storage refractory material may be above the thermal cracking temperature of the hydrocarbon. Thus, in accordance with this embodiment, a film of nickel is provided on such exposed surfaces.

This nickel film, the provision of which is disclosed and claimed in copending application Serial Number 491,985, filed March 3, 1955, by Charles G. Milbourne, one of the applicants hereof, may be provided by applying to the stated surfaces an aqueous solution of a nickel salt, removing water and reducing the salt to deposit the elemental metal. The solution may be applied as by spraying, brushing, or the like. During application, the solution penetrates the surface and sinks into the relatively porous refractory material. However, upon drying there will be some tendency for the solution to migrate toward the surface. The overall result is the provision of a relatively uniform deposit of finely-divided nickel on the surface on the refractory material. In connection with the foregoing, a nickel salt such as nickel ammonium chloride, nickel nitrate, nickel ammonium sulfate, nickel chloride, nickel sulfate, and the like, may be employed. A concentration of about 4 to 6% nickel, by weight, based on the outer 1/32 of an inch of surface, is provided. The amount of nickel deposited on the surface may vary from the above-stated amounts, and may be as low as about 2%, by weight, based on the outer 1/32 inch of surface. Amounts above about 8% of the same basis generally do not provide corresponding increases in effectiveness and hence, will generally not be employed. The nickel may, of course, penetrate to an extent greater than 1/32 of an inch, however, since the effect is primarily a surface effect, only the outer 1/32 inch may be reckoned with. Conveniently, the reduction of the salt, and, in fact, both drying and reduction, can take place during one heating operation, such as during the normal starting up of the unit where temperatures above 750° F. are employed.

The process of the present invention will be more clearly understood from a consideration of the following specific examples which are given for the purpose of illustration only and are not intended to limit the scope of the invention in any way.

EXAMPLES I–IV

In these examples commercial size equipment of the design shown generally in the drawing is employed comprising a combustion chamber and an upright, 10 ft. I. D., refractory-lined shell. The catalyst zone is disposed as a layer across the shell and supported by refractory arches. Two minute cycles are employed, the gas-making portion taking up 38–42% of the cycle. Following each gas-making run is a steam purge taking up 1–2% of the cycle, then a blast of air alone taking up 1–2% of the cycle. Following this, fuel is burned in the presence of excess air and the resulting oxygen-containing products of combustion are passed through the catalyst zone. This takes up 45–51% of the cycle. At the end of this step the nickel exists in oxidized form. Following brief air-and-steam purges, which take up 3–11% and 1–3%, respectively of the cycle, the gas-making run is repeated. The first increments of hydrocarbon reactant which break down to hydrogen are relied upon to reduce the oxidized nickel to elemental form.

*Example I*

In this example the catalyst, in two different sizes, is arranged in two superposed layers. One layer, 3 inches deep, consists of pebbles having a diameter of .5 inch, and the other layer, 14¼ inches deep, consists of pebbles 1 inch in diameter. In both catalysts sizes the amount of nickel in the outer 1/32 inch of surface is 1.5 lbs. per 100 square feet of surface area, and the mass of the combined catalyst is 165.5 lbs. per 100 square feet surface area.

During the gas-making period, kerosene is vaporized and passed through the catalyst zone at a rate corresponding to 433 lbs. carbon per hour per 100 square feet of catalyst surface, or 283 lbs. carbon per hour per lb. of available nickel (in the outer 1/32 inch layer).

The resulting gas has a heating value of 838 B. t. u. (N₂ free basis), and 77.2% of the carbon in the kerosene appears in the gas. 63.5% as gaseous hydrocarbons and 13.5% as carbon monoxide plus hydrogen.

*Example II*

In this example the catalyst consists of 1 inch spheres, and the amount of nickel in the outer 1/32 inch of surface is 2.77 lbs. per 100 square feet of surface. The depth of the catalyst zone is 15 inches, and the mass of catalyst is 195 lbs. per 100 square feet of surface. During the gas-making run, kerosene is vaporized and passed through the catalyst zone at a rate corresponding to 630 lbs. of carbon per hour per 100 square feet of catalyst surfaces, or 215 lbs. carbon per hour per lb. of available nickel.

The resulting gas has a heating value of 740 B. t. u. (N₂ free basis), and 72.7% of the carbon in the kerosene appears in the gas, 54.2% as gaseous hydrocarbons and 18.5% as carbon monoxide plus hydrogen.

*Example III*

In this example the catalyst zone is made up of 1 inch spheres having 1.64 lbs. of nickel per 100 square feet of surface area in the outer 1/32 inch. The bed depth is 15 inches, and the mass of catalyst is 195 lbs. per 100 square feet of surface.

During the gas-making run, kerosene is vaporized and passed through the catalyst zone at a rate corresponding to 490 lbs. carbon per hour per 100 square feet of surface, or 280 lbs. carbon per hour per lb. of available nickel.

The resulting gas has a heating value of 734 B. t. u. ($N_2$ free basis) and 73.2% of the carbon in the kerosene appears in the gas, 54.6% as gaseous hydrocarbons and 18.6 as carbon monoxide plus hydrogen.

*Example IV*

In this example the catalyst zone consists of 1 inch spheres at a depth of 9 inches. The catalyst bodies contain 2.77 lbs. of nickel in the outer 1/32 inch per 100 square feet of surface. The mass of the catalyst is 195 lbs. per 100 square feet of surface.

During the gas-making run, kerosene is employed, being passed, in vaporized form, through the catalyst zone at a rate corresponding to 834 lbs. carbon per hour per 100 square feet of catalyst surface, or 284 lbs. carbon per hour per lb. of available nickel.

The resulting gas has a heating value of 705 B. t. u. ($N_2$ free basis), and 71.2% of the carbon of the kerosene appears in the gas, 52% as gaseous hydrocarbons and 19.2% as carbon monoxide plus hydrogen.

EXAMPLES V–XI

In these examples the catalyst is arranged in an upright refractory-lined shell having an inner diameter of 13 inches. Two minute cycles are employed, the gas-making portion taking up 40–50% of the cycle.

*Example V*

In this example the catalyst bodies are in the form of cylinders 2 inches in diameter and 2 inches in length. The catalyst zone is 66 inches in depth. The amount of nickel in the outer 1/32 inch of catalyst body is 1.41 lbs. per 100 square feet of surface, and the mass of the catalyst bodies is 858 lbs. per 100 square feet.

During the gas-making portion of the cycle, diesel oil is vaporized and passed through the catalyst zone at a rate corresponding to 516 lbs. carbon per hour per 100 square feet of catalyst surface, or 366 lbs. carbon per hour per lb. of available nickel.

The resulting gas has a heating value of 842 B. t. u. ($N_2$ free basis), and 74.1% of the carbon in the diesel oil appears in the gas, 62.7% as gaseous hydrocarbons and 11.4% as carbon monoxide plus hydrogen.

*Example VI*

This example is the same as Example V, except that the refractory material with which the oil comes into contact before reaching the catalyst zone possesses a coating of nickel provided by spraying these surfaces with an aqueous solution of a nickel salt, drying and reducing the salt to elemental nickel.

The resulting gas has a heating value of 1032 B. t. u. ($N_2$ free basis), and 79.5% of the carbon in the diesel oil appears in the gas, 71.1% as gaseous hydrocarbons and 8.4% as carbon monoxide plus hydrogen.

*Example VII*

In this example the catalyst zone consists of 1 inch spheres at a depth of 8 inches. The amount of available nickel is 1.4 lbs. per 100 square feet of surface, and the mass of catalyst is 192 lbs. per 100 square feet of catalyst surface.

During the gas-making portion of the cycle, kerosene is vaporized and passed through the catalyst zone at a rate corresponding to 704 lbs. carbon per hour 100 square feet of catalyst surface, or 520 lbs. carbon per hour per lb. of available nickel.

The resulting gas has a heating value of 678 B. t. u. ($N_2$ free basis), and 72.1% of the carbon in the kerosene appears in the gas, 51.9% as gaseous hydrocarbons and 20.2% as carbon monoxide plus hydrogen.

*Example VIII*

In this example the catalyst zone consists of 1 inch spheres at a depth of 4.4 inches. The catalyst bodies contain 2.8 lbs. of available nickel per 100 square feet of surface, and the mass of the catalyst is 200 lbs. per 100 square feet of surface.

During the gas-making portion of the cycle, vaporized kerosene is passed through the catalyst zone at a rate corresponding to 1270 lbs. carbon per hour per 100 square feet of catalyst surface, or 425 lbs. carbon per hour per lb. of available nickel.

The resulting gas has a heating value of 664 B. t. u. ($N_2$ free basis), and 77% of the carbon in the kerosene appears in the gas, 53.4% as gaseous hydrocarbons and 23.6% as carbon monoxide plus hydrogen.

*Example IX*

In this example the catalyst zone consists of ½ inch spheres at a depth of 4.4 inches. The catalyst bodies contain 2.4 lbs. of available nickel per 100 square feet of surface, and the mass of catalyst is 97 lbs. per 100 square feet of surface.

During the gas-making portion of the cycle, gasoline is vaporized and passed through the catalyst zone at a rate corresponding to 690 lbs. carbon per hour per 100 square feet of surface, or 290 lbs. carbon per hour per lb. of available nickel.

The resulting gas has a heating value of 835 B. t. u. ($N_2$ free basis), and 70.6% of the carbon in the gasoline appears in the gas, 53.5% as gaseous hydrocarbons and 17.1% as carbon monoxide plus hydrogen.

*Example X*

This example is the same as Example IX except that the catalyst zone depth is only 1.6 inches and the gasoline is passed through the catalyst zone at a rate corresponding to 612 lbs. carbon per hour per 100 square feet of catalyst surface, or 254 lbs. carbon per hour per lb. available nickel.

The resulting gas has a heating value of 692 B. t. u. ($N_2$ free basis), and 78.2% of the carbon in the gasoline appears in the gas, 58.9% as gaseous hydrocarbons and 18.4% as carbon monoxide plus hydrogen.

*Example XI*

This example is the same as Example IX except that the gasoline is passed through the catalyst zone at a rate corresponding to 556 lbs. carbon per hour per 100 square feet of catalyst surface, or 232 lbs. carbon per hour per lb. of available nickel.

The resulting gas has a heating value of 655 B. t. u. ($N_2$ free basis), and 83.8% of the carbon of the gasoline appears in the gas, 59.4% as gaseous hydrocarbons and 24.4% as carbon monoxide plus hydrogen.

Modification is possible in the selection of the various conditions, factors and techniques followed and observed as well as in the combinations thereof, without departing from the scope of the invention.

We claim:

1. The cyclic method for producing a combustible gas rich in oil gas which comprises, in one part of the cycle, passing a vaporized normally liquid petroleum hydrocarbon and steam, at a ratio of between about 0.8 and about 3 pounds of steam per pound of carbon in said hydrocarbon, into a hot stationary zone of catalyst having temperatures of at least 1400° F. at which high B. t. u. gas-making reactions with the liquid petroleum hydrocarbon selected are promoted and the water gas reaction and carbon deposition held at a minimum, having a temperature gradient no greater than about 100° F. and comprising nickel-containing refractory bodies having a mass between about 95 and about 1000 pounds per 100 square feet of surface and a nickel concentration, in the outer ½₂ inch of surface, of between about 1.4 and about 4 pounds per 100 square feet of surface, said hydrocarbon being passed into said catalyst zone at a rate to give a value between about 2 and about 6 for the ratio:

$$\frac{\text{Hydrocarbon feed rate (lb. carbon/hour)}}{\text{Catalyst surface (ft.}^2) \times \text{Ni concentration (lb./100 ft.}^2 \text{ surface)}}$$

then, before the temperature in the catalyst zone falls appreciably more than about 100° F. and below 1400° F., discontinuing the flow of hydrocarbon and steam and reheating the catalyst zone and regenerating the same by burning therefrom carbon and sulfur deposited therein while maintaining a temperature gradient of no greater than about 100° F.

2. The method of claim 1 wherein hot refractory surfaces with which said vaporized petroleum hydrocarbon comes into contact before passing into said catalyst zone are coated with nickel.

3. The cyclic method for producing a combustible gas rich in oil gas which comprises, in one part of the cycle, passing a vaporized normally liquid petroleum hydrocarbon and steam, at a ratio of between of about 0.8 and 3 pounds of steam per pound of carbon in said hydrocarbon, into a hot stationary zone of catalyst having temperatures of at least 1400° F. at which high B. t. u. gas-making reactions with the liquid petroleum hydrocarbon selected are promoted and the water gas reaction and carbon deposition held at a minimum, having a temperature gradient no greater than about 100° F. and comprising nickel-containing refractory bodies having a mass between about 95 and about 1000 pounds per 100 square feet of surface and a nickel concentration, in the outer ½₂ inch of surface, of between about 2 and about 4 pounds per 100 square feet of surface, said hydrocarbon being passed into said catalyst zone at a rate to give a value between about 3 and about 6 for the ratio:

$$\frac{\text{Hydrocarbon feed rate (lb. carbon/hour)}}{\text{Catalyst surface (ft.}^2) \times \text{Ni concentration (lb./100 ft.}^2 \text{ surface)}}$$

then, before the temperature in the catalyst zone falls appreciably more than about 100° F. and below 1400° F., discontinuing the flow of hydrocarbon and steam; burning a fuel and passing the resulting hot products of combustion through said catalyst zone to store heat therein, passing free oxygen into said catalyst zone to burn therefrom carbon and sulfur deposited therein and to oxidize nickel in said catalyst zone, and then passing oxidizable gas into said catalyst zone reducing said oxidized nickel with the oxidation of said gas in said catalyst zone by virtue of the oxygen of said oxidized nickel, the proportions of heat provided by said hot combustion products, the combustion of the deposited carbon and the said nickel-oxidation, nickel-reduction and gas-oxidizing sequence providing a temperature gradient in said catalyst zone of no greater than about 100° F.

4. The method of claim 1 wherein the concentration of nickel in the outer ½₂ inch of catalyst surface is between about 2 and about 3 lbs. per 100 square feet of catalyst surface, and the hydrocarbon is passed into the catalyst zone at a rate to give a value between about 3 and about 5 for said ratio.

5. The cyclic method for producing a combustible gas rich in oil gas which comprises, in one part of the cycle, passing a vaporized normally liquid petroleum hydrocarbon and steam, at a ratio of between about 0.8 and about 3 pounds of steam per pound of carbon in said hydrocarbon, into a hot stationary zone of catalyst having temperatures of at least 1400° F. at which high B. t. u. gas-making reactions with the liquid petroleum hydrocarbon selected are promoted and the water gas reaction and carbon deposition held at a minimum, having a temperature gradient no greater than about 100° F. and comprising nickel-containing refractory bodies having a mass between about 95 and about 1,000 pounds per 100 square feet of surface and nickel concentration, in the outer ½₂ inch of surface, of between about 2 and about 4 pounds per 100 square feet of surface, said hydrocarbon being passed into said catalyst zone at a rate to give a value between about 3 and about 6 for the ratio:

$$\frac{\text{Hydrocarbon feed rate (lb. carbon/hour)}}{\text{Catalyst surface (ft.}^2) \times \text{Ni concentration (lb./100 ft.}^2 \text{ surface)}}$$

then, before the temperature in said catalyst zone falls appreciably more than about 100° F. and below 1400° F., discontinuing the flow of hydrocarbon and steam; passing air into said catalyst zone to burn therefrom carbon and sulfur deposited therein and to oxidize nickel in said catalyst zone; burning a fuel and passing the resulting hot products of combustion through said catalyst zone to store heat therein, and then passing oxidizable gas into said catalyst zone reducing said oxidized nickel with the oxidation of said gas in said catalyst zone by virtue of the oxygen of said oxidized nickel, the proportions of heat provided by said hot combustion products, the combustion of the deposited carbon and the said nickel-oxidation, nickel-reduction and gas-oxidizing sequence providing a temperature gradient in said catalyst zone of no greater than about 100° F.

6. The cyclic method for producing a combustible gas rich in oil gas which comprises, in one part of the cycle, passing vaporized normally liquid petroleum hydrocarbon and steam, at a ratio between about 0.8 and about 3 pounds of steam per pound of carbon in said hydrocarbon, into a hot stationary zone of catalyst having temperatures of at least 1400° F. at which high B. t. u. gas-making reactions with the liquid petroleum hydrocarbon selected are promoted and the water gas reaction and carbon deposition held at a minimum, having a temperature gradient no greater than about 100° F. and comprising nickel-containing refractory bodies having a mass between about 95 and about 1000 pounds per 100 square feet of surface and a nickel concentration, in the outer ½₂ inch of surface, of between about 2 and about 4 pounds per 100 square feet of surface, said hydrocarbon being passed into said catalyst zone at a rate to give a value between about 3 and about 6 for the ratio:

$$\frac{\text{Hydrocarbon feed rate (lb. carbon/hour)}}{\text{Catalyst surface (ft.}^2) \times \text{Ni concentration (lb./100 ft.}^2 \text{ surface)}}$$

then, before the temperature in said catalyst zone falls appreciably more than about 100° F. and below 1400° F.; discontinuing the flow of hydrocarbon and steam; burning a fuel in the presence of excess air and passing the resulting hot oxygen-containing products of combustion through said catalyst zone, the oxygen in said products of combustion passing through said catalyst zone being sufficient to burn therefrom carbon and sulfur deposited therein and to oxidize nickel in said catalyst zone, and then passing into said catalyst zone an oxidizable gas reducing said oxidized nickel with the oxidation of said gas in the catalyst zone by virtue of the oxygen of said oxidized nickel, the proportions of heat provided by said combustion products, the combustion of deposited carbon and said nickel-oxidation, nickel-reduction and gas-combustion sequence providing a temperature gradient over said catalyst zone of no greater than about 100° F.

References Cited in the file of this patent

UNITED STATES PATENTS

| | | |
|---|---|---|
| 2,042,998 | Johnson | June 2, 1936 |
| 2,071,286 | Johnson et al. | Feb. 16, 1937 |
| 2,524,840 | Shapleigh | Oct. 10, 1950 |
| 2,555,210 | Wadill et al. | May 29, 1951 |
| 2,665,979 | Taussig | Jan. 12, 1954 |